Figure 1:
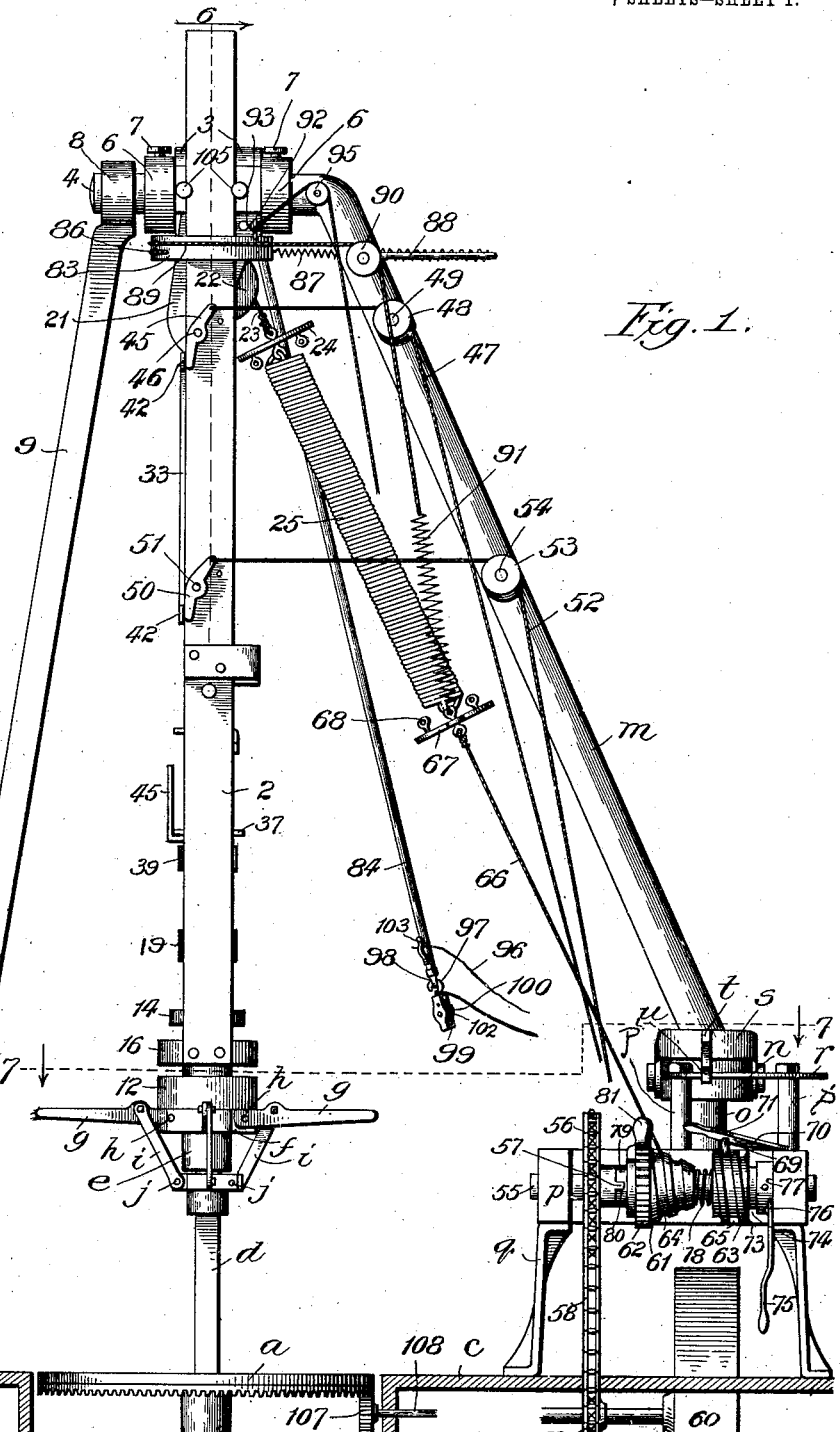

No. 759,401. PATENTED MAY 10, 1904.
J. E. SIMMONDS.
CORN SHOCKING MECHANISM.
APPLICATION FILED APR. 6, 1903.
NO MODEL. 7 SHEETS—SHEET 1.

Witnesses:
Chas. E. Gaylord
John Enders Jr.

Inventor:
James E. Simmonds,
By Thomas F. Sheridan,
Att'y

No. 759,401. PATENTED MAY 10, 1904.
J. E. SIMMONDS.
CORN SHOCKING MECHANISM.
APPLICATION FILED APR. 6, 1903.
NO MODEL. 7 SHEETS—SHEET 2.

Witnesses:

Inventor:
James E. Simmonds,
By Thomas F. Sheridan,
Att'ys

No. 759,401. PATENTED MAY 10, 1904.
J. E. SIMMONDS.
CORN SHOCKING MECHANISM.
APPLICATION FILED APR. 6, 1903.
NO MODEL. 7 SHEETS—SHEET 3.
Fig. 3.
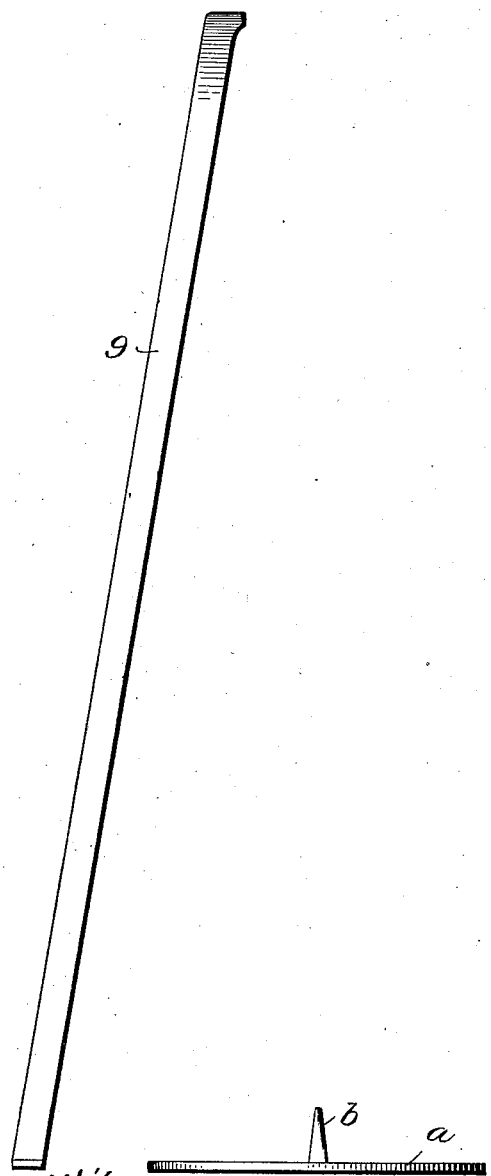
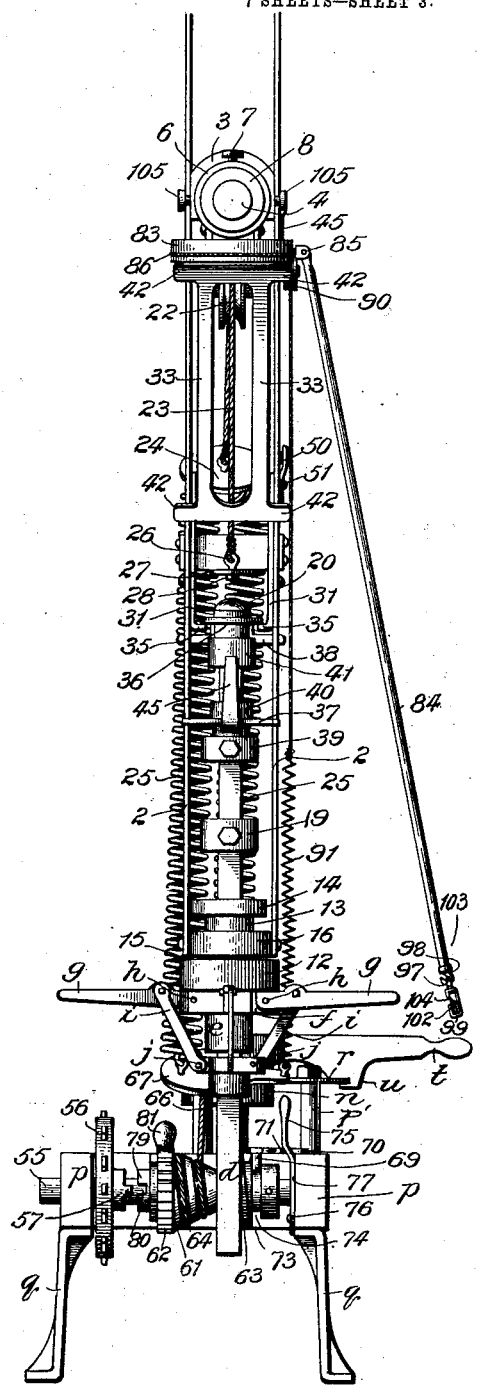
Witnesses:
Inventor:
James E. Simmonds.
By Thomas F. Sheridan,
Att'y

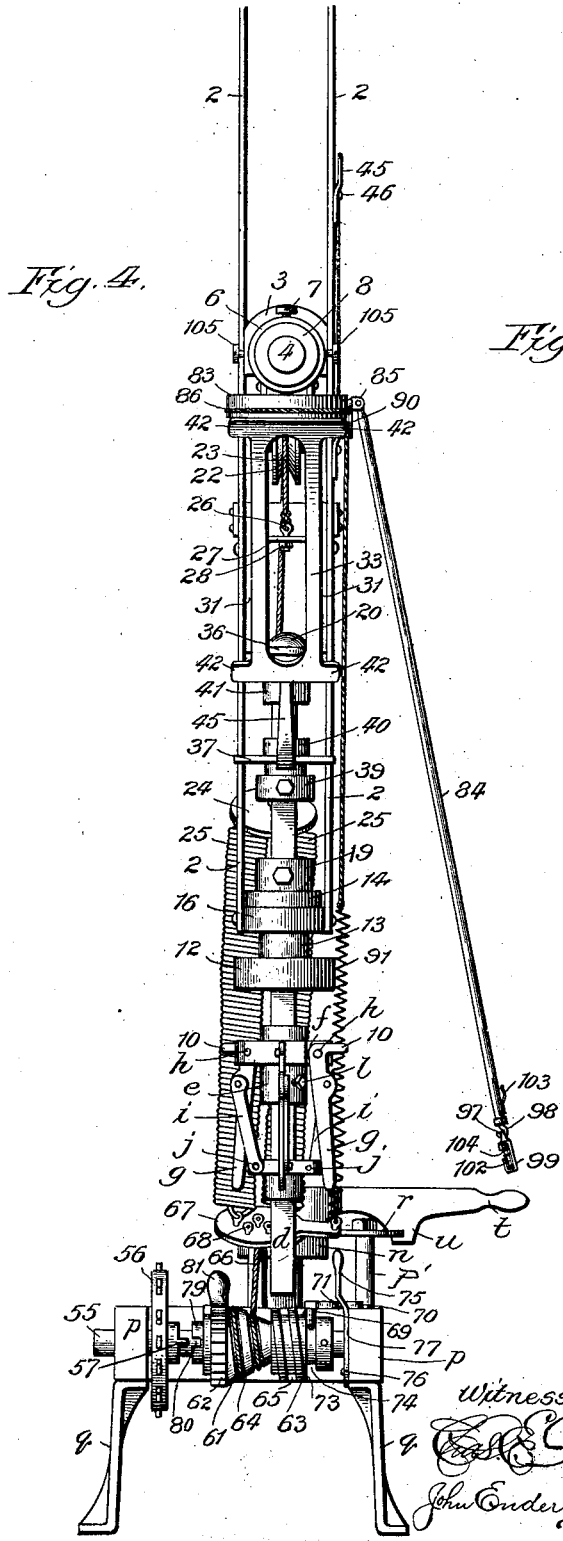

No. 759,401. PATENTED MAY 10, 1904.
J. E. SIMMONDS.
CORN SHOCKING MECHANISM.
APPLICATION FILED APR. 6, 1903.
NO MODEL. 7 SHEETS—SHEET 5.
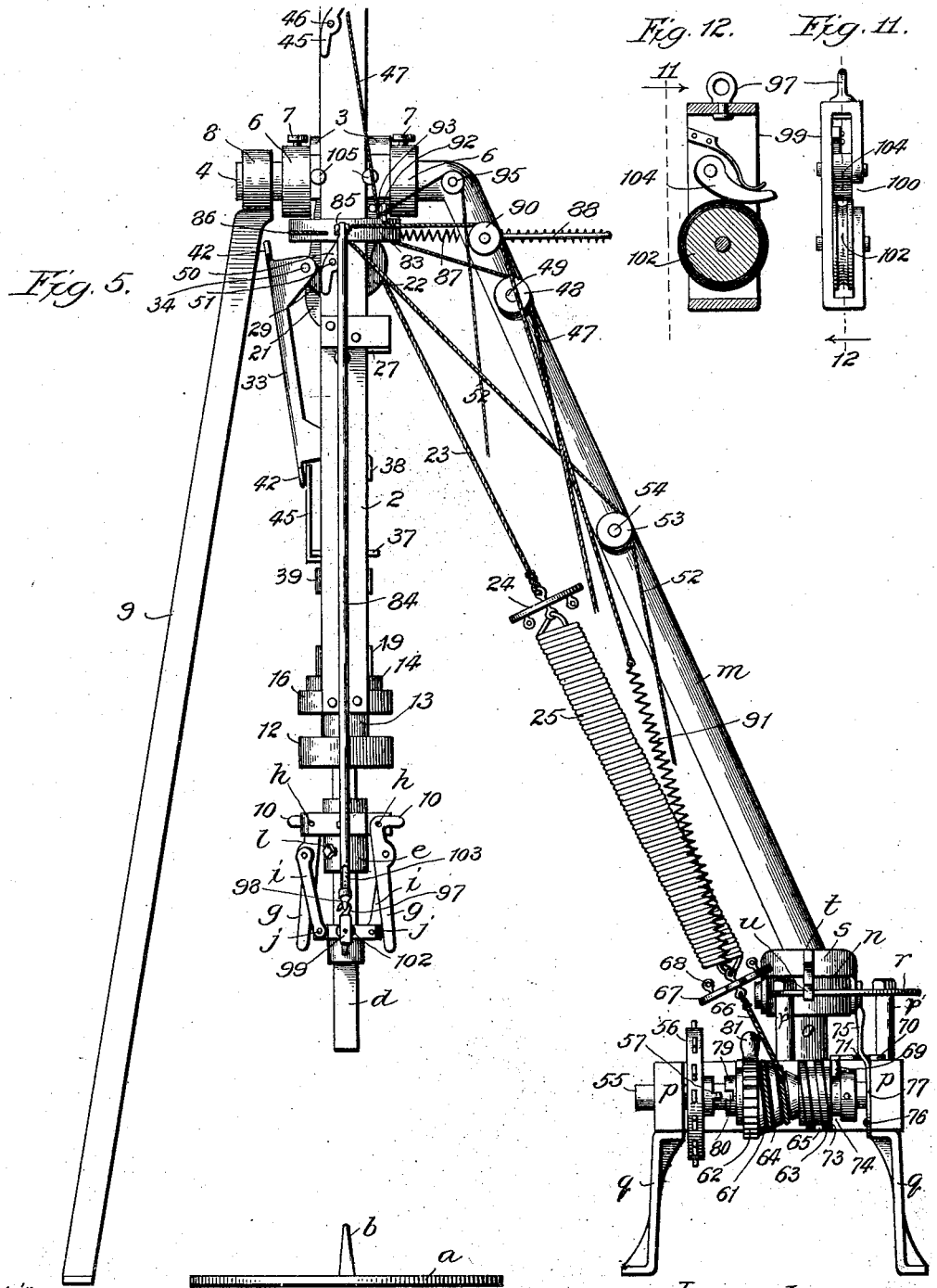
Witnesses:
Chas. E. Gaylord.
John Enders Jr.
Inventor:
James E. Simmonds,
By Thomas F. Sheridan,
Atty.

No. 759,401. PATENTED MAY 10, 1904.
J. E. SIMMONDS.
CORN SHOCKING MECHANISM.
APPLICATION FILED APR. 6, 1903.
NO MODEL. 7 SHEETS—SHEET 6.
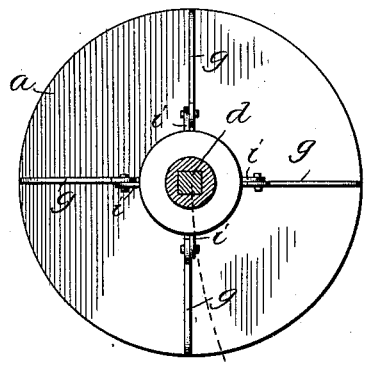
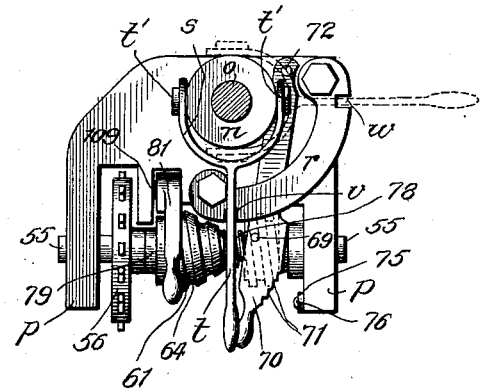
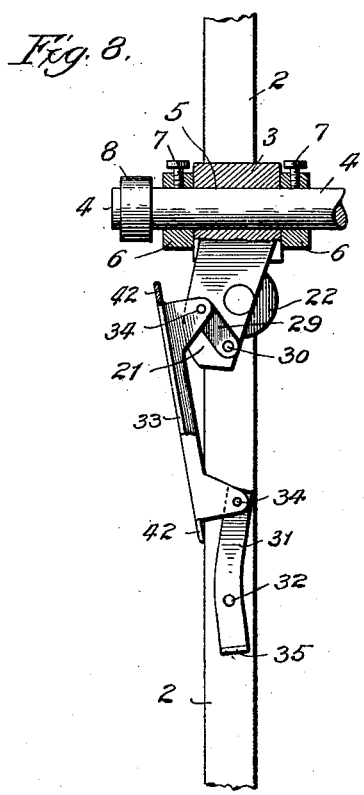
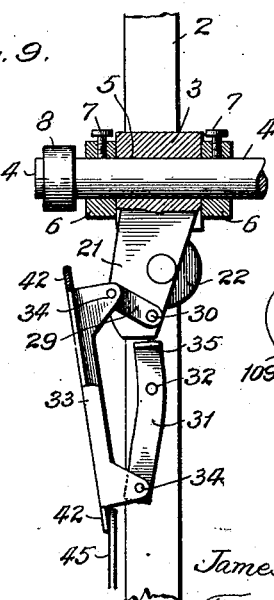
Witnesses:
Chas. E. Gaylord.
John Enders Jr.
Inventor:
James E. Simmonds,
By Thomas F. Sheridan,
Att'y.

No. 759,401. PATENTED MAY 10, 1904.
J. E. SIMMONDS.
CORN SHOCKING MECHANISM.
APPLICATION FILED APR. 6, 1903.
NO MODEL. 7 SHEETS—SHEET 7.

Witnesses:
Chas. E. Gaylord.
John Enders.

Inventor:
James E. Simmonds,
By Thomas F. Sheridan
Att'y

No. 759,401.

Patented May 10, 1904.

UNITED STATES PATENT OFFICE.

JAMES E. SIMMONDS, OF CAMPPOINT, ILLINOIS.

CORN-SHOCKING MECHANISM.

SPECIFICATION forming part of Letters Patent No. 759,401, dated May 10, 1904.

Application filed April 6, 1903. Serial No. 151,379. (No model.)

*To all whom it may concern:*

Be it known that I, JAMES E. SIMMONDS, a citizen of the United States, residing at Camppoint, in the county of Adams and State of Illinois, am the inventor of certain new and useful Improvements in Corn-Shocking Mechanisms, of which the following is a specification.

My invention relates to that class of corn cutting and shocking machines provided with a rotatable upright supporting arm or crane mounted upon the frame thereof and provided with a shock suspending and carrying frame suspended from the upper swinging end of such crane. Such a shock-suspending frame is usually provided at its lower end with movable shock-supporting arms mounted upon an upright support or spindle which is supported by the suspending-frame when such frame is in swinging position.

My invention therefore relates to the means for automatically raising the shock-suspending frame with the shock while the shock-supporting arms are in extended position, collapsing the shock-supporting arms, and automatically raising the suspending-frame, shock-supporting arms, and spindle to a still higher position with the arms collapsed to drop the shock and withdraw the spindle and supporting-arms therefrom.

It relates particularly to the means for automatically raising the shock - suspending frame and arms, and thereby the shock and the revolving platform upon which the shock is built, and carrying it to the desired position to be discharged, to the means for discharging the shock and withdrawing the shock-supporting arms and spindle therefrom and returning the parts to their initial position, and to the means for winding or tightening the tension-springs and regulating the tension thereof.

It relates, further, to the means for holding the suspending-frame in either of a plurality of necessary vertical positions against the tension of the supporting-springs, to the means for holding the shock - supporting arm and spindle mechanism in the necessary vertical positions with relation to the suspending-frame, to the means for tripping the locking and supporting lever mechanism which holds such shock-supporting frame against the tension of its supporting-springs, and to the means for tripping the locking and supporting lever mechanism which supports the shock-supporting spindle and arm mechanism upon the suspending-frame when desired.

The principal object of my invention is to provide a simple, economical, and efficient corn-shocking mechanism.

A further object of the invention is to provide a corn-shocking device with means for automatically raising the shock from the position in which it is built, carrying it to the desired position with relation to the machine, and withdrawing the shock-supporting arms therefrom to cause the shock to drop in the desired position and permit the shock supporting and carrying mechanism to be withdrawn from contact with the shock and returned to its original position.

A further object of the invention is to provide suitable means for automatically raising the shock-suspending frame and supporting-arms with the shock and means for storing the power necessary to operate such parts.

A further object of the invention is to provide, in a corn-shocking mechanism having a portable upright rotatable crane provided with a shock-supporting frame and shock-supporting arms suspended therefrom, suitable locking - lever mechanism for holding the shock-supporting-arm mechanism in the desired position with relation to the frame and for holding the suspending-frame against the tension of the supporting operating-springs and in the desired vertical planes, means for tripping the mechanism which locks such suspending-frame against the tension of the supporting-springs, means for tripping the locking and supporting levers which hold the shock-supporting arms in the desired positions in relation to the suspending-frame, and spring mechanism for automatically raising and holding such suspending-frame and shock-supporting arms into the desired positions.

A further object is to provide means for automatically setting such spring mechanism at a tension and for regulating the tension thereof.

A further object is to provide means for throwing a rope and a strand of binding-twine substantially around the shock while in position upon the platform upon which it is built, so as to enable the shock to be adjusted and bound before being raised and without the necessity of the operator leaving the machine to bind and adjust the same.

A further object of the invention is to provide means for automatically turning the crane, with its suspending mechanism, and thereby the shock, from the position in which such elements are arranged while the shock is being built to position to drop the shock in the desired place with relation to the machine.

A further object is to provide the spring-winding mechanism with means for throwing it into and out of operative engagement with the driving mechanism of an ordinary corn cutting and shocking machine, whereby it is adapted to be operated during the intervals when the machine is not easily loaded.

Other and further objects of the invention will appear from an inspection of the drawings and the following description and claims.

The invention consists in the features, combinations, and details of construction hereinafter described and claimed.

Figure 2:
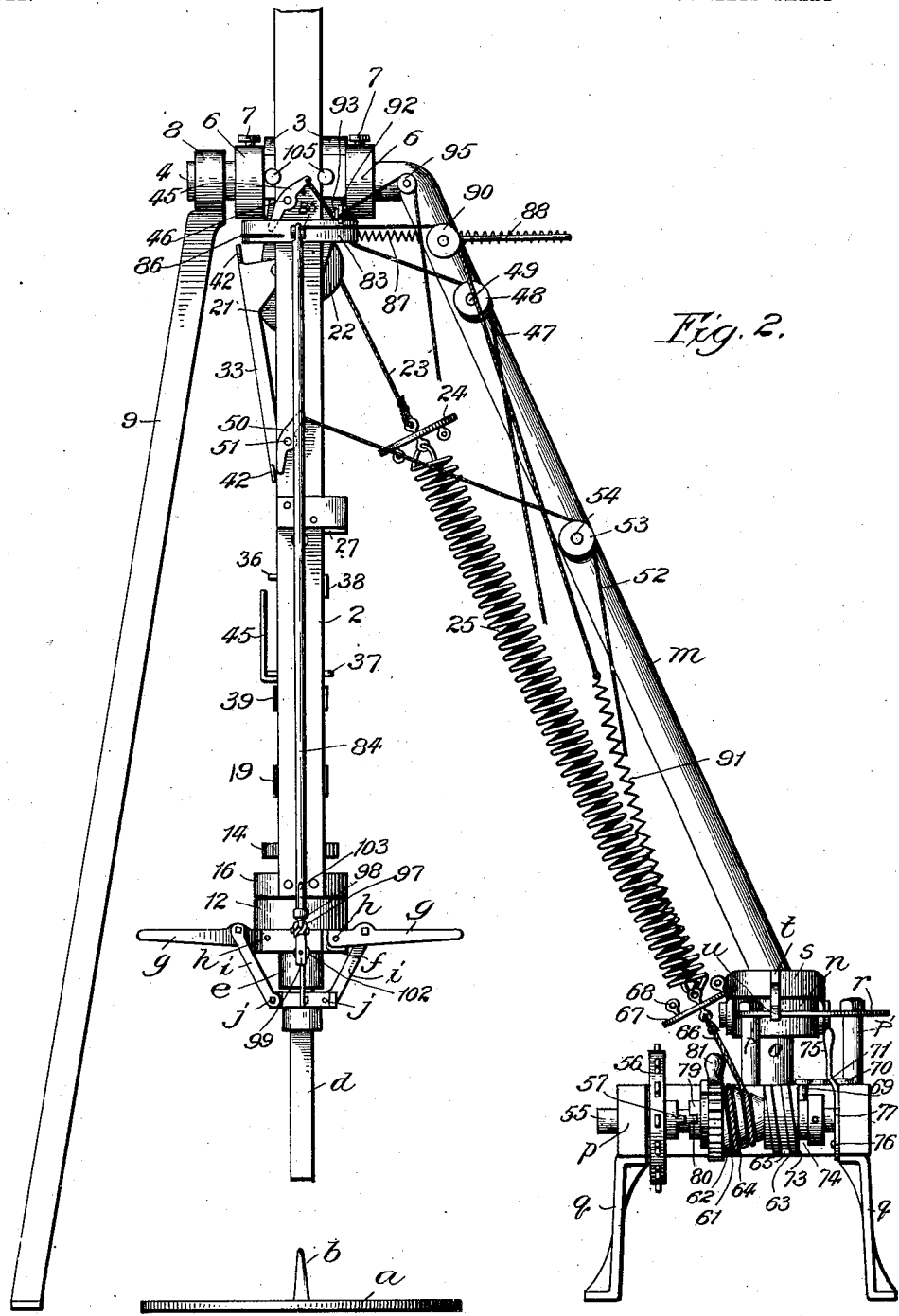
Figure 13:
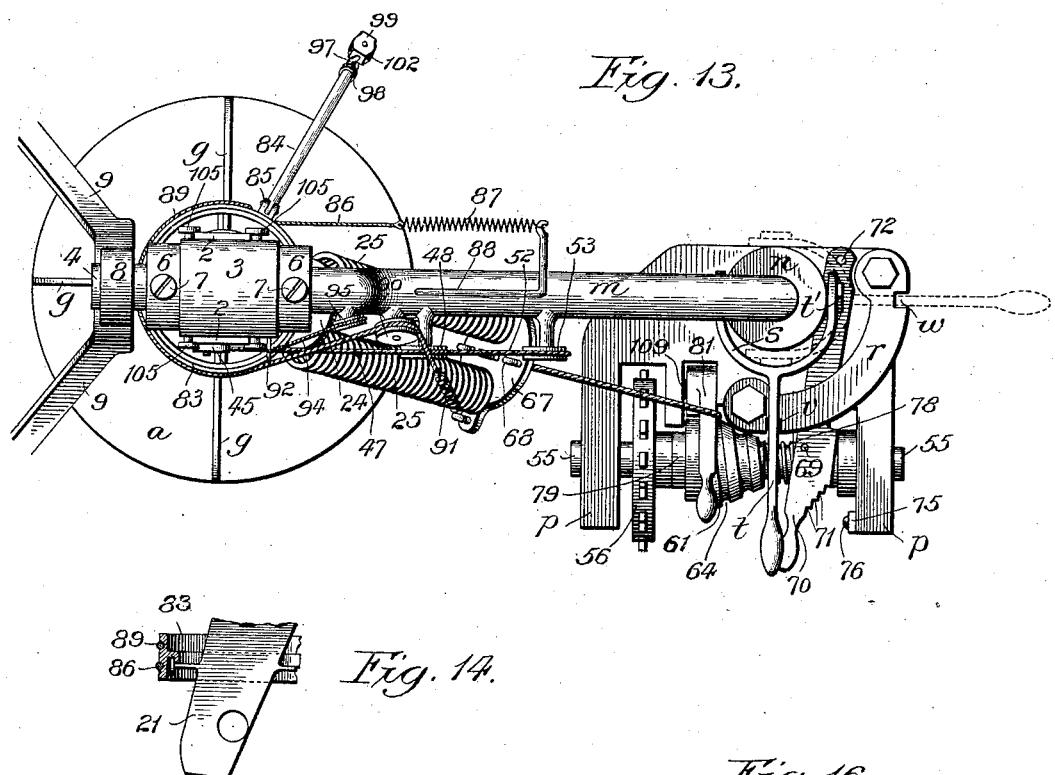
Figure 14:
Figure 15:
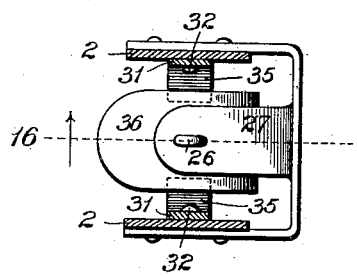
Figure 16:
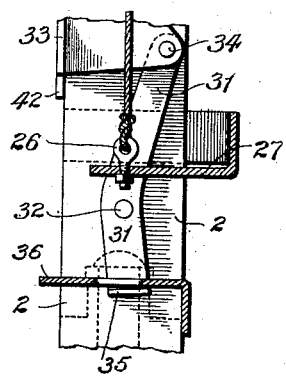

In the accompanying drawings, Figure 1 is a rear elevation of the device, showing the shock-suspending frame and shock-supporting arms in their initial lowered position; Fig. 2, a rear elevation showing the shock-supporting frame in its intermediate position and the suspending-frame and shock supporting and operating springs at a tension with the spring-winding mechanism out of engagement with the driving sprocket-wheel; Fig. 3, a rear elevation showing the shock-suspending frame in its intermediate position vertically and in position to support the shock and ready to drop it in place upon the ground; Fig. 4, a similar view, in rear elevation, showing the shock-supporting arms collapsed and the shock-suspending frame in its highest position after dropping the shock; Fig. 5, a rear elevation showing the shock-suspending frame in its highest position with the shock-supporting arms collapsed and immediately over the revolving platform, ready to be lowered into operative position thereon; Fig. 6, a sectional elevation showing the shock-suspending frame and shock-supporting spindle both in their lowermost position; Fig. 7, a detail plan view of the mechanism for winding and regulating the tension of the operating-springs and of the lever and bracket mechanism for holding the crane in the desired position with relation to the revolving platform and showing the rearward position of the shock-supporting-arm mechanism in dotted lines; Fig. 8, a detail sectional view in elevation of the locking-lever mechanism, showing its position when the shock-suspending frame is in intermediate position vertically and the shock-suspending arms extended; Fig. 9, a similar view showing the locking and supporting lever mechanism in position when the shock-suspending frame is in its highest position and the shock-supporting arms collapsed; Fig. 10, an end view of the winding-worm ratchet; Fig. 11, a view in elevation of the shock-compressing pulley, and Fig. 12 a sectional view of the same with its pawl. Fig. 13 is a plan view of a machine, showing the shock-supporting mechanism in connection with the crane-arm; Fig. 14, a detail view of a portion of the ring which supports the arm for carrying the twine around the shock; Fig. 15, a detail sectional plan view of the suspending-frame at the point of connection with the cable; and Fig. 16 a broken sectional elevation in detail, taken on line 16 of Fig. 15 looking in the direction of the arrow.

In illustrating and describing my invention I have shown and described only such parts as are new in combination with so much that is old as is necessary to enable those skilled in the art to make and practice the same, omitting modifications, equivalents, and old elements.

In constructing a device in accordance with my improvements a revolving platform $a$ is provided, having an upright centering-pin $b$, which platform may be of any ordinary and well-known type. The platform is rotatably mounted upon the frame $c$ of an ordinary corn cutting and shocking machine and provided with driving-gear mechanism for rotating such platform connected with any desired driven shaft of the machine. A shock-supporting core or spindle $d$, having an axial opening $c'$ and suitable clutch mechanism (not shown) at its lower end, is rotatably mounted in an upright position centrally of such revolving platform in engagement with the centering-pin and is provided with shock-supporting head and arm mechanism mounted thereon, comprising a head $e$, arranged in fixed relation to the shock-supporting spindle and provided with radial slots $f$, in which are mounted collapsible arms $g$, pivotally connected to such head by means of pivots $h$ and provided with braces $i$, mounted in pivotal engagement with such shock-supporting arms at one end and in pivotal engagement with a guide-collar $j$ at the other end, which collar is slidingly mounted upon the shock-supporting spindle, the supporting-head being held in position and in fixed relation to the spindle by means of a close-fitting axial opening $k$, through which such spindle extends, and a set-screw $l$, all of which is common and well known in the art.

An upright crane $m$ is provided and rotatably mounted in a suitable frame $p$ on the main frame of an ordinary corn cutting and shocking machine. This frame is provided with a suitable perpendicular cylindrical opening to form a socket, in which the lower perpendicular portion $o$ of the crane is mounted and in which the crane may readily rotate when desired and adapted to sustain it in position, all of such parts being of such dimensions as to withstand the stress and strains to which they are subjected in operation. The frame $p$ is provided with suitable legs or standards $q$, rigidly attached to the frame of the machine for bracing and supporting such frame, and thereby the crane, and for supporting the winding mechanism hereinafter described. The frame $p$ is also provided with standards $p'$, upon which is mounted a slotted guide-plate $r$, and a collar $n$ is mounted upon the crane in fixed relation thereto and provided with a hand-lever $t$, having a projecting lug portion $u$ adapted to enter slots $v$ and $w$ in such guide-plate. The hand-lever is pivotally connected with the collar $n$ by means of pivot-pins $t'$, preferably arranged upon opposite sides of such collar and extending through arms $s$ of such lever, whereby the crane may be rotated from rearward position to initial position, or vice versa, when desired and held in either of such positions.

It is desirable that means be provided for automatically raising the shock from the platform upon which it is built and for automatically collapsing the shock-supporting arms, above described, to discharge or unload the shock, also for swinging the shock to rearward position and after dropping it to withdraw the shock-supporting spindle and supporting-arm mechanism from engagement with the shock, so that they may be readily returned to initial position. It is also desirable that means be provided whereby the power necessary to perform these operations may be stored by the operation of the machine during the intervals when a comparatively small portion of the shock has been formed and the machine is consequently without its load and running as lightly as possible. To accomplish these objects, I provide a shock-suspending frame 2, which is slidably mounted in a head 3, arranged upon the upper horizontal end portion 4 of the crane and provided with an axial perforation 5, through which such crane extends. This head is preferably sufficiently loose to permit the suspending-frame to swing pivotally upon the crane, and is held in position by means of collars 6, mounted at each side thereof and firmly attached to the crane by means of set-screws 7 or similar elements. A rotatable ring or wheel 8 is mounted upon the outer end of the crane, adapted to rest upon the upper end of a standard 9, which is firmly mounted upon the frame of the machine outside of the shock-suspending frame for bracing the crane firmly in position when the parts are in position to form the shock. To hold the shock-supporting arms in extended position, each of such arms is provided at its inner end with an upwardly-extending lug 10, adapted to engage an annular flange or shoulder 11 at the lower end of a sleeve 12, which sleeve is provided with an upwardly-extending central body portion 13, having an upper annular shoulder 14 thereon.

The lower end of such sleeve projects outward laterally beyond the central body portion thereof, so that it forms an annular shoulder adapted to engage the end of the suspending-frame. The lower end of the shock-suspending frame is provided with an inwardly-extending, preferably annular, flange or rim 16, having an axial perforation 17, through which the central body portion of the sleeve 12 extends. The shock-supporting spindle, which extends loosely through an axial perforation 18 in the sleeve 12, is provided with a fixed collar 19, mounted thereon above the sleeve, and the upper end of such spindle is provided with a supporting-head 20. By this arrangement it will be readily seen that when the parts are in the position shown in Fig. 6 the sleeve 12 will hold the shock-supporting arms in their extended position firmly, notwithstanding the great weight of the shock resting upon such arms.

To support the shock-spindle, with its arm mechanism, and thereby the shock, in the desired position with relation to the shock-suspending frame and to support the shock-suspending frame in each of the different vertical positions which it must assume in operation and hold it against the tension of the supporting-springs, the head 3 is provided with a downwardly-extending bracket 21, in which is mounted a sheave-pulley 22, and a cable or equivalent flexible element 23 is mounted in the pulley and connected at one end by means of a spring-plate 24 to, preferably, a plurality or "gang" of springs 25 and at the other end to the shock-suspending frame, preferably at the axial center thereof, by means of an eye-bolt 26, mounted in the frame in a plate 27, which plate may be attached to the frame in any desired manner, as by means of bolts. (See Figs. 2 and 3.) The plate 27, as shown in the drawings, has perpendicular side portions bolted to the frame and an inwardly-extending bottom portion, to which the cable is attached by means of the eyebolt 26. The eyebolt is held in position thereon by means of a nut 28. The cable may be fastened to such frame in any ordinary and well-known manner. One or more locking-levers 29 are mounted pivotally upon the bracket of the head 3 by means of a pivot-pin or pivot-pins 30. These levers may be either integral or separate from each other, and a lever or pair of levers 31 is mounted in the frame by means of a pivot 32, which levers may also be either integral or separate. The levers 29 and 31 are connected by means of a link 33 and pivot-pins 34, and the lower end of each of the lower pair of levers is provided with an inwardly-projecting hook or shoulder 35, adapted to engage the annular shoulder 36 of the head 20 on the upper end of the shock-supporting spindle when such levers are in the position shown in Figs. 2, 3, and 8 and while the shock-suspending frame is in its intermediate position, with the shock-supporting arms extended, and also, as in Figs. 1 and 6, while the shock-suspending frame is in its lowest position and the arms extended. This lower pair of lever-arms is thus in position to sustain the shock-supporting spindle and the weight of the shock while such spindle and shock are being raised and swung into position to be dropped. When such levers are thrown out of engagement with the shouldered head of the shock-supporting spindle, it will be readily seen that the weight of the shock will cause the spindle to descend with its sleeve until the upper annular shoulder thereof engages the inwardly-extending end flange 16 of the suspending-frame, at which point the sleeve 12 will be suddenly arrested in its downward movement, and the weight of the shock will carry the supporting-arms downward out of engagement therewith, thereby causing such arms to collapse and the shock to be released. It descends until the collar 19 comes in contact with the upper end of the shouldered sleeve 12, and the spindle and shock and arm mechanism is arrested and held in position thereby. The shock-spindle is provided with guides 37 and 38, which are held in fixed relation to the spindle by means of shoulders 39, 40, and 41, firmly attached to such spindle and which may be of one integral piece with the guides.

The actuating-springs 25 are at a tension when the shock-spindle and supporting-arm mechanism are released, as above described, and the suspending-frame up to the time of releasing of the spindle is prevented by the locking-levers from ascending in response to the action of the spring mechanism 25. The pivotal centers of the locking-lever 31 and the link 33 are so arranged with relation to each other that the lower pivot 34 is off center or to the right of a line drawn from pivot 32 to pivot 34 when such lever-and-link mechanism is in the position shown in Fig. 8. This is also the case when such lever-and-link mechanism is in the position shown in Fig. 6, so that the suspending-frame is held down and prevented from ascending until the upper pivot 34 is moved past the center and to the left of pivot 32. It will therefore be seen that by moving the lower end of the link 33 to the left from its position shown in Fig. 6 the shock-spindle is released, as above described, and the shock-supporting arms caused to collapse, and at the same time the suspending-frame is released and permitted to spring upward to the position shown in Figs. 4 and 5, so that the locking-lever mechanism is thrown to the position shown in Fig. 9 simultaneously, or nearly so, with the releasing and downward movement of the shock-supporting spindle and the collapsing of its arms.

The above-described upward movement of the suspending-frame is its second upward movement in the course of the regular operation of the machine, but has been described in connection with the description of the shock-supporting spindle and its downward movement and in connection with the collapsing of the shock-supporting arms because of the intimate relation of these parts and their simultaneous actions.

The first upward movement of the suspending-frame carries both the suspending-frame and shock-spindle, with its supporting-arm mechanism, upward together. The parts being in the position shown in Figs. 1 and 6, the relative positions of the pivotal centers of the levers 29 and link 33 prevent the upward movement of the suspending-frame. The center of both pivots 34 are to the right of a line drawn from the pivots 30 and 32, and the upper pivot 34 is to the right of a line drawn from the lower pivot 34 to pivot 30. In order to permit the suspending-frame mechanism, with the shock-supporting-spindle, to be raised by the actuating-springs, it is only necessary to throw the upper end of the link 33 to the left, thus changing the relation of the upper pivotal center 34 to the pivotal centers above described. This will cause the lever-and-link mechanism to assume the position shown in Fig. 8, accomplishing the first upward movement of the suspending-frame. The lever mechanism being in the position shown in Fig. 8, it will be readily seen that by moving the lower end of the link 33 to the left the second upward movement of the suspending-frame, already described, and the substantially simultaneous downward movement of the shock and spindle will take place, throwing the locking-lever and link mechanism to the position shown in Fig. 9, dropping the shock and withdrawing the spindle and arms therefrom. The link 33 is provided with shoulders 42, which engage the side of the suspending-frame and prevent the ends of the locking-levers from going farther than is necessary to the right. To prevent accidental dislodging or tripping of the link and locking mechanism, above described, a spiral spring 43 is attached at one end to the link and at the other end to the projecting portion 44 of the frame and set at the desired tension to hold the link and locking mechanism yieldably in position. A guard 245 is also provided and mounted in the suspending-frame in position to engage the lower shoulder 42 of the link when it is in the position shown in Fig. 9. This prevents the pivotal center of the lower pivot 34 from passing to the right of locking position, and thus allows the suspending-frame to be readily lowered from its uppermost position to its original position.

In order to throw the upper locking-lever and the upper end of the link 33 to the left to produce the first upward movement of the suspending-frame, tripping mechanism is provided, comprising a tripping-lever 45, pivotally mounted in the frame upon a pivot 46 in engagement with the upper end of the link 33 and provided with a tripping-cord or flexible element 47, attached to the opposite free end of the tripping-lever and extending over a sheave-pulley 48, rotatably mounted on a pivot 49, and downward to a position readily reached by the operator. This cord may be attached to the projecting end 150 of the link 29, if desired, without departing from the spirit of my invention.

To trip the locking-lever 31 by moving the upper end thereof and the lower end of the link 33 to the left, so as to produce the second upward movement of the suspending-frame and release the shock and spindle, so as to cause the shock-supporting arms to collapse, as hereinafter described, a second tripping-lever 50 is mounted in the frame by means of a pivot-pin 51 in engagement with the lower end of the link, as shown in Fig. 1, and a tripping-cord 52 is attached to the opposite free end of such lever and extended over a sheave-pulley 53, mounted rotatably upon the crane by means of a pivot-pin 54 and arranged to extend downward within easy reach of the operator. This cord may be attached to the lower hooked end of the link 31, if desired, without departing from the spirit of my invention.

In order to automatically store up the energy necessary to produce the above-described operations of the suspending-frame, shock-supporting arm, and spindle mechanism and also to provide means for automatically swinging the crane with its load from the position shown in Figs. 1, 2, and 6 to the positions shown in Figs. 3 and 4, all by means of the mechanism herein described in connection with the mechanism of an ordinary corn cutting and shocking machine during the intervals of time when a comparatively small amount of the shock has been loaded or formed on the machine, a spring setting or winding mechanism is provided, comprising a shaft 55, rotatably mounted in the frame p, already described, and a sprocket-wheel 56, mounted upon such shaft preferably in fixed relation thereto and rotatable therewith and provided on one side with a clutch-lug 57. It will be understood that this sprocket-wheel 56 may be mounted upon the main driving-shaft of an ordinary corn cutting and shocking machine in lieu of the shaft 55, if desired; but I prefer to mount it upon the shaft 55, as shown in the drawings. A gear or worm and gear may be substituted for the sprocket-wheel; but I prefer the latter. The sprocket-wheel is connected by means of a chain 58 to a driving-sprocket 59 upon the main driving-shaft 60 of the machine. It will be readily understood that the driving-sprocket 59 may be mounted upon any desired driven shaft of an ordinary machine without departing from the spirit of my invention. A conical winding-wheel or fusee 61 is rotatably mounted upon the shaft and provided at one end with a ratchet portion 62, and a worm 63 is mounted on the same shaft adjacent to such conical winding-wheel or fusee and in fixed relation to the shaft, the fusee and worm r provided with spiral grooves 64 and 65, respectively. The groove 64 of the conical winding-wheel is adapted to receive and wind the cable or similar flexible element 66, which is attached at one end to the spring 25 by means of a spring-plate 67, provided with eyebolts 68, and at the other end to the enlarged end of the conical worm. The spiral grooves of the worm-wheel 63 are adapted to receive a lug 69 upon a lever-arm 70, which is pivotally mounted in the frame and provided with stepped shoulders 71 for stopping the winding mechanism. I prefer to make this lever of flexible material, such as tempered steel, and mount it in the frame, so as to be horizontally movable upon a pivot 72, as shown in Fig. 7, with its outer end capable of being raised out of the slots in the worm-wheel and above the shoulders forming such slots. The lever is also thus enabled to throw the lug 69 downward beyond the shouldered end 73 of the worm into the slot 74 to prevent the clutch mechanism being thrown into operative engagement accidentally so as to start the winding mechanism. A lever 75 for stopping the lever 70 is pivotally mounted by means of a pivot 76 in the frame p adjacent to the right-hand end of the worm and the free end of the lever 70 and in sliding engagement with the shoulder 77 of the frame, and a spiral spring 78 is mounted intermediate the fusee and worm encircling the shaft upon which such elements are mounted. By this arrangement the lever 75 may be placed in position to engage the stepped or shouldered end of the lever 70, so as to stop such lever at any desired point in its movement toward the right, as shown in Fig. 7. The lever 70 being placed in initial position, so that the shoulder 69 is at the left-hand end of the worm 63, it will be readily understood that such lever will move to the right in response to the rotation of the worm until it comes in contact with the lever 75. Its movement thus being arrested, it forces the worm, with the driving-shaft and sprocket-wheel, to the left, thus throwing the sprocket-wheel and driving mechanism out of operative engagement with the conical winding-wheel or fusee by causing the shoulder 57 of the sprocket-wheel to become disengaged from the clutch-shoulder 79 and slot 80 on the conical winding-wheel, as shown in Fig. 3.

In order to prevent the conical winding-wheel from turning backward while the actuating-springs are left at a tension and to regulate the tension of the springs and gradually relax them when desired, a ratchet-lever 81 is pivotally mounted in the frame in toothed engagement with the ratchet of the winding-wheel and is provided with a friction lever or lug 109, adapted to frictionally engage a drum 181 at the side of the ratchet portion of the winding-wheel. The spring winding or setting mechanism, and particularly the conical winding-wheel above described, is so located with relation to the shock-suspending frame and swinging end of the crane that when the spring mechanism is wound to the necessary tension to operate the parts, as above described, it will also serve to swing the crane, with its load, from the position shown in Fig. 1 to the positions shown in Fig. 3.

It will be appreciated by those skilled in the art that the conical winding-wheel or fusee being of larger diameter at the initial winding end thereof will wind the cable and actuating-springs more rapidly while the springs are at a relatively low tension and gradually decrease the rapidity of winding such springs in proportion as the tension of the springs increase, also that the springs may thus be wound rapidly and the winding completed before the shock becomes of such size as to materially occupy the energies of the team, thus materially saving the team.

In completing the shock it is found by practical experience that the stalks assume a somewhat slanting position, which is very detrimental unless corrected, and it is necessary under present conditions for the driver to get off the machine and walk around the shock, so as to encircle it with a rope for straightening it and to place the twine around it with which it is to be bound. In order to enable this to be accomplished without the driver getting off the machine, I mount an arm-supporting ring 83 rotatably upon the head at the swinging end of the crane, so as to encircle the shock-suspending frame, and provide it with a downwardly-extending arm 84, preferably pivotally mounted in such ring by means of a pivot-pin 85, so as to swing outward laterally, but rotate with such ring. For rotating the ring, and thereby the downwardly-extending arm to its initial position, a cord 86 is attached at one end to such ring and rove around it. This cord is attached at its other end to a spiral spring 87, mounted upon an arm 88 upon the crane. An annular groove may be made in the ring for receiving the cord. To rotate the arm in the opposite direction or from initial position, a similar cord 89 is attached at one end to the arm-supporting ring and rove around it in the opposite direction to the cord already described and over a sheave-pulley 90, rotatably mounted on the crane to a spiral spring 91, which is heavier and when at a tension has a greater strength than the spring 87, and therefore serves to throw the arm from initial position when the arm-supporting ring is released. A pawl 92, which may be of any ordinary type, is pivotally mounted, preferably, in the head and is adapted to enter a slot 93 in such ring, which slot may be of any desired form which will provide an ordinary shoulder adapted to be engaged by such pawl to hold the ring in initial position against the tension of the spring 91, and a pawl-operating cord 94 is attached to such pawl and extended over a sheave-pulley 95, rotatably mounted upon the crane and so arranged as to extend downward within easy reach of the operator. A pulley 96 is provided with an open hook 97, removably mounted in an eye 98 on the end of the downwardly-extending arm above described, and this pulley is provided with a casing 99, having an opening or slot 100 therein adapted to receive the rope 101 for tightening and straightening the shock, and is provided with a pulley-wheel 102, over which the rope extends in operation. A spring-catch 103 is mounted upon the end of the arm above described, in which the end of the binding-twine is arranged, and locking-pawl mechanism 104 is mounted upon such casing for receiving the rope when tightened around the shock and holding it in tightened position while the binding is being knotted.

The spring-plates 24 and 67 are provided with screw-eyes 68 or similar elements, one centrally of each plate and a plurality on opposite sides of the center of the plate, so arranged, as shown in Fig. 4, that any desired number of springs may be mounted between such spring-plates without destroying the balance or, in other words, so arranged as to preserve a balance no matter what number of springs are used. This is very desirable in view of the fact that heavy corn will necessitate the use of much heavier springs or a larger number of springs than light corn, and this arrangement affords very desirable means for accomplishing the ends sought. The spring 91, which operates the rope-carrying arm, is very light in comparison with the actuating-springs 25 and is attached, preferably, to the spring-plate 67, so as to be wound at the same time with the main actuating-springs and by the same means, and being so very light comparatively it has substantially no effect in destroying the balance which should be maintained by the main actuating-springs.

The shock-suspending frame is held in sliding engagement with the head 3 by means of shouldered bolts 105 or any ordinary equivalent element.

The revolving platform $a$ is provided with an annular gear 106, mounted in toothed engagement with the gear-wheel 107 upon a shaft 108 in operative engagement with the driving-shaft of any ordinary corn cutting and shocking machine. The gear 107 may be mounted upon any desired driven shaft of an ordinary corn cutting and shocking machine without departing from the spirit of my invention.

In operation the conical winding-wheel or fusee, which is rotatably mounted upon the shaft, and the adjacent worm, which is mounted in fixed relation thereto, are at the start in the position shown in Fig. 1, with the spring-winding cable at the initial winding end of the conical winding-wheel and the lug of the lever 70 in engagement with the slot of the adjacent worm at its initial or left-hand end. The sprocket-wheel is in engagement with the winding-wheel by means of the clutch already described, and the shocking-spindle and shock-supporting-arm mechanisms are in the position shown in Fig. 1. When the team is started, the sprocket-wheel is driven in the direction necessary to wind the cable 66 and tighten the supporting and operating springs, as indicated by the position thereof in Fig. 1, and the worm, which is in fixed relation to the shaft, causes the lever 69 to move to the right, where it enters the slot 74 and engages the shouldered end of the worm. Before it reaches this point, however, it has come in contact with the lever 75, which has arrested its motion to the right, and it therefore forces the worm and shaft against the tension of the spring 78 until the driving sprocket-wheel is thrown out of engagement with the conical winding-wheel. The driving sprocket-wheel and the shaft on which it is mounted, as well as the worm which is in fixed relation thereto, are thus permitted to rotate independently of the conical winding-wheel, which is held firmly in position by the ratchet mechanism, so as to maintain the tension of the main actuating-springs. The machine then continues in motion until the shock is cut and built to the desired size. It is then stopped and the rope and twine carrying arm 84 released, so as to throw the rope substantially around the shock. The rope-carrying pulley is then removed from the arm and the shock straightened and compressed by means of the rope and pulley. One end of the rope is attached rigidly to the pulley, and the other end extends therethrough in engagement with the pulley-wheel. The shock being straightened and compressed to the desired extent, the rope is held by the pawl mechanism on the pulley, so as to retain it in such compressed position while the binding-twine is knotted. The knotting of the twine may be performed in any ordinary and well-known manner. This having been accomplished, the rope, which is necessarily much stronger than the binding-twine, may be left upon the shock until it is dropped to the ground or may be removed from the shock. In either case, the shock having been compressed, the tripping-cord 47 is pulled, so as to throw the upper end of the link 33 to the left, thus allowing the shock-suspending frame to be raised by the supporting and operating springs to intermediate position—that shown in Fig. 2. The tension of the gang of actuating-springs being at the proper angle, as before suggested, causes the crane, with the shock-supporting frame, to swing to the rearward of the machine, as shown in Fig. 3. When it has reached this point, the operating-cord 52 is pulled, throwing the lower end of the link 33 to the left and tripping the locking-lever 31, thereby dropping the shock. Up to this time lever 31 has been in position, as shown in Figs. 4 and 8, to prevent the shock and supporting-frame 2 from ascending and has also prevented the shock-spindle and shock-supporting-arm mechanism from descending. The tripping of the lever 31, as above suggested, thus causes the shock-spindle to descend with relation to the shock-suspending frame and the suspending-frame to ascend simultaneously and jerk the collar 12 out of engagement with the shock-supporting arms, permitting them to collapse, so as to be freed from the shock, and the upward movement of the shock-suspending frame continued, so as to raise the shock-spindle and collapsed shock-suspending arms out of engagement with the shock and leave the parts ready to be returned to initial position. The supporting actuating-springs are thus left in their normal or collapsed position, so that there is no tension to prevent the return of the crane to initial position. The lever-arm $t$ is then employed to return the crane, with the shock-suspending frame, to position over the revolving platform. This being done, the ratchet mechanism is released and the detent-shoulder of the ratchet-lever pressed closely against the drum of the winding-wheel, so as to permit the shock-suspending frame and its spindle and arm mechanism to gradually descend into position in engagement with the revolving platform. While the spindle and suspending-arms are descending, the operator grasps one of the supporting-arms and moves it to extended position, with its inner end in engagement with the annular collar, as already described. The locking-lever, trips, and also the winding-wheel, and clutch-operating worm are all thus caused to assume their initial position, and the apparatus is ready for another operation.

I claim—

1. In mechanisms of the class described, the combination of a frame, a crane rotatably mounted therein, a shock-suspending frame movably mounted upon the swinging end of such crane, shock-supporting mechanism movably mounted in such suspending-frame, and spring mechanism connected to the shock-suspending frame for raising it and thereby the shock, substantially as described.

2. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, and means for winding the spring mechanism, substantially as described.

3. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, and a conical wheel connected with such spring mechanism for winding it, substantially as described.

4. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, a wheel connected with such spring mechanism for winding it, chain-and-sprocket mechanism in engagement with the spring-winding wheel and connected with the driving-shaft of the shocking-machine, and means for throwing such chain-and-sprocket mechanism into and out of engagement with the winding-wheel mechanism, substantially as described.

5. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, a wheel connected with such spring mechanism for winding it, chain-and-sprocket mechanism in engagement with the spring-winding wheel and connected with the driving-shaft of the shocking-machine, clutch mechanism for connecting and disconnecting the winding-wheel and its driving mechanism, a worm for operating the clutch mechanism, and a spring for throwing the clutch mechanism into operative position, substantially as described.

6. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, means for winding the spring mechanism, a lever connected with the crane, and a guide provided with a slot for receiving such lever when the crane is in one position, and a second slot for receiving it when the crane is in a second position and thereby hold the crane removably in such positions, substantially as described.

7. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, means for winding the spring mechanism, lever mechanism mounted in the suspending-frame in engagement with the shock-supporting mechanism for supporting such mechanism in the suspending-frame, and means for tripping such lever mechanism, substantially as described.

8. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, and supporting it while in raised position, means for winding the spring mechanism, lever mechanism connected with the suspending-frame for holding such frame and the shock-supporting mechanism therein in initial position against the tension of the operating spring mechanism and permitting the suspending-frame and shock-supporting mechanism to be raised by such spring mechanism when such lever mechanism is released, and means for tripping such lever mechanism, substantially as described.

9. In mechanisms of the class described, the combination of a frame, a crane rotatably mounted therein, a shock-suspending frame movably mounted upon the swinging end of such crane, shock-supporting mechanism movably mounted in such suspending-frame, spring mechanism connected to the shock-suspending frame for raising it, means for winding the spring mechanism, lever mechanism connected to the suspending-frame and in engagement with the shock-supporting mechanism for supporting such mechanism and thereby the shock upon the suspending-frame and for holding such frame and the shock-supporting mechanism therein in initial position against the tension of the operating spring mechanism and permitting the suspending-frame and shock-supporting mechanism to be raised by such spring mechanism when such lever mechanism is released, and means for tripping such lever mechanism, substantially as described.

10. In mechanisms of the class described, the combination of a frame, a crane mounted therein, a shock-suspending frame movably mounted upon the upper end of such crane, actuating mechanism for raising the shock-suspending frame, locking mechanism for holding the suspending-frame removably in locked position with relation to the crane against the action of such actuating mechanism, and means for operating such locking mechanism, substantially as described.

11. In mechanisms of the class described, the combination of a frame, a crane mounted therein, a shock-suspending frame movably mounted upon the upper end of such crane, shock-supporting mechanism mounted upon such suspending-frame movable with relation thereto, means for raising the shock-suspending frame and thereby such shock-supporting mechanism, lever mechanism for holding the suspending-frame removably in locked position with relation to the crane and movable into and out of engagement with such shock-supporting mechanism for holding such shock-supporting mechanism in position, means for moving the lever mechanism into locked position with relation to the suspending-frame and crane, and means for tripping such lever mechanism to permit the upward movement of the suspending-frame with relation to the crane, substantially as described.

12. In mechanisms of the class described, the combination of a frame, an upright crane rotatably mounted in such frame and provided with a head at the outer swinging end thereof, a shock-suspending frame slidably mounted in such head, spring mechanism connected with such shock-suspending frame, mechanism in engagement with the driving-shaft for winding such spring mechanism to a tension, locking mechanism for holding such suspending-frame against the tension of the spring mechanism, and means for tripping such locking mechanism, substantially as described.

13. In mechanisms of the class described, the combination of a frame, a crane mounted therein provided with an upper head portion, a shock-suspending frame movably mounted upon the upper head portion of such crane, shock-supporting mechanism mounted upon such suspending-frame movable with relation thereto, means for raising the shock-suspending frame and thereby such shock-supporting mechanism, and lever mechanism comprising an upper lever pivotally connected with the upper head portion of the crane a lower lever pivotally mounted upon the suspending-frame and movable independently of the upper lever into and out of engagement with the shock-supporting mechanism and an intermediate link pivotally connected with such upper and lower levers, substantially as described.

14. In mechanisms of the class described, the combination of a frame, an upright crane rotatably mounted in such frame and provided with a head at the outer swinging end thereof, a suspending-frame slidably mounted in such head provided with a lower flanged end, spring mechanism connected to such suspending-frame for raising it, a driving-shaft, mechanism in engagement with the driving-shaft for winding such spring mechanism to a tension, shock-supporting mechanism comprising a shock-supporting spindle and collapsible arms mounted thereon, a sleeve having a lower flanged shoulder portion movable into engagement with such collapsible arms such sleeve being in sliding engagement with the lower flanged end of the shock-suspending frame and having an upper annular shoulder above such flanged end of the suspending-frame, lever mechanism for holding the suspending-frame removably in locked position with relation to the crane such lever mechanism being movable into and out of engagement with such shock-supporting mechanism for holding such shock-supporting mechanism in position, and means for operating such lever mechanism, substantially as described.

15. In mechanisms of the class described, the combination of a frame, an upright crane rotatably mounted in such frame and provided with a head at the outer swinging end thereof, a suspending-frame slidably mounted in such head, actuating spring mechanism connected with such suspending-frame for raising it, a driving-shaft, mechanism connected with the driving-shaft for winding such spring mechanism to a tension, ratchet mechanism for holding the actuating spring mechanism at a tension and permitting it to be released, means for releasing and regulating the tension of the actuating spring mechanism, shock-supporting mechanism mounted upon such suspending-frame movable with relation thereto, lever mechanism for holding the suspending-frame removably in locked position with relation to the crane and movable into and out of engagement with such shock-supporting mechanism for holding it in position, means for operating such lever mechanism, an arm rotatably mounted with relation to the suspending-frame and provided with means for holding a rope to be carried thereby, means for rotating such arm, and means for rotating the crane, substantially as described.

16. In mechanisms of the class described, the combination of a frame, a crane rotatably mounted therein provided with shock-supporting mechanism slidably mounted at the swinging end thereof, spring mechanism for supporting and operating the shock-supporting mechanism, a cable connected at one end with the shock-supporting mechanism and at the other end with the spring mechanism, winding-wheel mechanism for winding and tightening such spring mechanism, a cable connecting such winding-wheel mechanism with the spring mechanism, and means for connecting such winding-wheel mechanism with the driving-shaft of an ordinary corn cutting and shocking machine and disconnecting it therefrom, substantially as described.

17. In mechanisms of the class described, the combination of a frame, a crane rotatably mounted therein provided with shock-supporting mechanism slidably mounted at the swinging end thereof, spring mechanism for supporting and operating the shock-supporting mechanism, a cable connected at one end with the shock-supporting mechanism and at the other end with the spring mechanism, winding-wheel mechanism for winding and tightening such spring mechanism, a cable connecting such winding-wheel mechanism with the spring mechanism, a shaft upon which such winding-wheel is rotatably mounted, a sprocket-wheel rotatably mounted upon such shaft and adapted to be connected with the driving-shaft of an ordinary corn cutting and shocking machine, clutch mechanism for connecting and disconnecting the sprocket-wheel and winding-wheel mechanism, and means for automatically operating such clutch mechanism to throw such parts out of engagement, substantially as described.

18. In mechanisms of the class described, the combination of a frame, a crane rotatably mounted therein provided with shock-supporting mechanism slidably mounted at the swinging end thereof, spring mechanism for supporting and operating the shock-supporting mechanism, a cable connected at one end with the shock-supporting mechanism and at the other end with the spring mechanism, winding-wheel mechanism for winding and tightening such spring mechanism, a cable connecting such wheel mechanism with the spring mechanism, a shaft upon which such wheel is rotatably mounted, a sprocket-wheel mounted upon such shaft and adapted to be connected with the driving-shaft of an ordinary corn cutting and shocking machine, clutch mechanism for connecting and disconnecting the sprocket-wheel and winding-wheel, a worm mounted in fixed relation to the shaft upon which the above-mentioned winding-wheel mechanism is mounted for operating the clutch mechanism, a lever pivotally mounted in the frame and provided with a lug in engagement with such winding-wheel, and spring mechanism upon the shaft intermediate such winding-wheel and worm for throwing the clutch into operative position, substantially as described.

19. In mechanisms of the class described, the combination of a frame, a crane rotatably mounted therein provided with shock-supporting mechanism slidably mounted at the swinging end thereof, spring mechanism for supporting and operating the shock-supporting mechanism, a cable connected at one end with the shock-supporting mechanism and at the other end with the spring mechanism, a fusee for winding and tightening such spring mechanism, a cable connecting such fusee with the spring mechanism, means for connecting such fusee with the driving-shaft of an ordinary corn cutting and shocking machine and disconnecting it therefrom, and means for rotating the crane and thereby swinging the shock-suspending mechanism to the desired positions, substantially as described.

20. In mechanisms of the class described, the combination of a frame, a crane rotatably mounted therein provided with shock-supporting mechanism slidably mounted at the swinging end thereof, spring mechanism for supporting and operating the shock-supporting mechanism, a cable connected at one end with the shock-supporting mechanism and at the other end with the spring mechanism, a fusee for winding and tightening such spring mechanism, a cable connecting such fusee with the spring mechanism, means for connecting such fusee with the driving-shaft of an ordinary corn cutting and shocking machine and disconnecting it therefrom, and means for regulating the tension of the spring mechanism, substantially as described.

21. In mechanisms of the class described, the combination of a frame, a crane rotatably mounted therein provided with shock-supporting mechanism slidably mounted in the swinging end thereof, spring mechanism for supporting and operating the shock-supporting mechanism, a cable connected at one end with the shock-supporting mechanism and at the other end with the spring mechanism, a fusee for winding and tightening such spring mechanism, a cable connecting such fusee with the spring mechanism, sprocket-wheel and clutch mechanism mounted in operative engagement with the work-wheel mechanism for connecting such fusee with the driving-shaft of an ordinary corn cutting and shocking machine and disconnecting it therefrom, a supporting-standard mounted upon the frame in engagement with the outer swinging end of the crane for supporting it in initial position, means for regulating the tension of the supporting-springs, and means for throwing the sprocket-wheel into and out of engagement with the spring-winding fusee, substantially as described.

22. In mechanisms of the class described, the combination of a frame, a crane rotatably mounted therein provided with shock-supporting mechanism slidably mounted at the swinging end thereof, spring mechanism for supporting and operating the shock-supporting mechanism, a fusee for winding such spring mechanism to a tension, a spring-plate connected to the actuating-springs at each end thereof so as to hold them in balanced relation to each other, a cable connected at one end with the suspending-frame and at the other with one of the spring-plates and thereby with the spring, a sheave-pulley over which such cable extends, a cable connected with the spring-plate at the opposite end of the springs and with the fusee, and means for stopping the winding of the cable at a predetermined point, substantially as described.

23. In mechanisms of the class described, the combination of a frame, a crane rotatably mounted therein provided with shock-supporting mechanism slidably mounted at the swinging end thereof, spring mechanism for supporting and operating the shock-supporting mechanism, a cable connected at one end with the shock-supporting mechanism and at the other end with the spring mechanism, conical winding-wheel mechanism for winding and tightening such spring mechanism, a cable connecting such winding-wheel mechanism with the spring mechanism, and means for connecting such winding-wheel mechanism with the driving-shaft of an ordinary corn cutting and shocking machine and disconnecting it therefrom, substantially as described.

24. In mechanisms of the class described, the combination of a frame, a crane rotatably mounted therein and provided with a shock-suspending frame slidably mounted at the outer swinging end thereof, collapsible shock-supporting arms, means for holding such shock-supporting arms extended and permitting them to collapse, spring mechanism connected with the suspending-frame for supporting it and swinging the frame and crane to the desired position, a fusee connected with such spring mechanism, sprocket-wheel mechanism adapted to be connected with the driving-shaft of a corn cutting and shocking device, means for throwing such sprocket-wheel mechanism into and out of engagement with the spring-winding fusee, means for holding the suspending-frame removably in locked position with relation to the crane and against the tension of the actuating spring mechanism, and means for rotating the crane, substantially as described.

25. In mechanisms of the class described, the combination of a frame, a crane rotatably mounted therein, a shock-suspending frame movably mounted upon the swinging end of such crane, shock-supporting mechanism movably mounted in such suspending-frame, a ring mounted at the swinging end of the crane and provided with a downwardly-extending arm, a pulley removably mounted upon such arm provided with a pulley-wheel and having a casing provided with an opening in the side thereof, bisecting such casing at one side of the pulley-wheel for receiving a rope, means for holding one end of the rope in fixed engagement with the pulley, and pawl mechanism mounted upon the pulley for removably retaining the rope in position, substantially as described.

26. In mechanisms of the class described, the combination of a frame, a crane-arm mounted therein, a cable movably mounted at the extended end of such crane-arm and provided at one end with means for engaging a shock to hold it suspended, spring mechanism connected with the other end of such cable for moving it in one direction and thereby raising the shock, and means for stretching such spring mechanism and holding it at a tension, substantially as described.

27. In mechanisms of the class described, the combination of a frame, a crane mounted therein, a cable suspended from the extended end of such crane-arm provided at one end with means for engaging a shock to hold it suspended, spring mechanism connected with the other end of such cable for moving it in one direction and thereby raising the shock, winding-wheel mechanism for stretching such spring mechanism, means for holding the spring mechanism at a tension, and means for holding the cable against the tension of the spring and permitting it to be released, substantially as described.

28. In mechanisms of the class described, the combination of a frame, a crane-arm rotatably mounted therein, a pulley mounted at the extended end of such crane-arm, a cable extending through such pulley and provided at one end with means for engaging a shock to hold it suspended, spring mechanism connected with the other end of such cable for moving it in one direction and thereby raising the shock, means for stretching such spring mechanism to the desired tension, means for holding it at a tension, means for holding the cable against the tension of the spring mechanism, and means for releasing the cable to permit the spring mechanism to contract and thereby raise the shock, substantially as described.

29. In mechanisms of the class described, the combination of a frame, a crane-arm mounted therein, a cable suspended from the extended end of such crane-arm provided at one end with means for engaging a shock to hold it suspended, a fusee, mechanism for connecting such fusee with a suitable source of power, and spring mechanism connecting such fusee with the cable, substantially as described.

30. In mechanisms of the class described, the combination of a frame, a crane-arm mounted therein, a cable suspended from the extended end of such crane-arm provided at one end with means for engaging a shock to hold it suspended, winding-wheel mechanism, sprocket mechanism for connecting such winding-wheel mechanism with a suitable source of power, spring mechanism connected at one end with such winding-wheel mechanism and at the other end with the cable, means for holding the cable against the tension of such spring mechanism, and means for releasing it to permit the spring mechanism to contract and the shock to be raised, substantially as described.

JAMES E. SIMMONDS.

Witnesses:
HARRY I. CROMER,
A. S. SAVOIE.